(12) United States Patent
Muthuswamy et al.

(10) Patent No.: US 11,398,996 B2
(45) Date of Patent: Jul. 26, 2022

(54) SYSTEM AND METHOD TO CREATE GLOBAL CONVERSATION THREAD ACROSS COMMUNICATION CHANNELS

(71) Applicant: International Business Machines Corporation, Armonk, NY (US)

(72) Inventors: Srinivasan S. Muthuswamy, Bangalore (IN); Subhendu Das, Chapel Hill, NC (US); Yashodara M. Patnaik, Pune (IN); Negandhi Vrunda Ravindra, Maharashtra (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 91 days.

(21) Appl. No.: 16/460,482

(22) Filed: Jul. 2, 2019

(65) Prior Publication Data

US 2021/0006524 A1    Jan. 7, 2021

(51) Int. Cl.
*H04L 51/00*    (2022.01)

(52) U.S. Cl.
CPC .................................. *H04L 51/16* (2013.01)

(58) Field of Classification Search
CPC ...................................................... H04L 51/16
See application file for complete search history.

(56) References Cited

U.S. PATENT DOCUMENTS

| | | | |
|---|---|---|---|
| 6,192,394 B1 | 2/2001 | Gutfreund et al. | |
| 7,693,940 B2 | 4/2010 | Carmel et al. | |
| 8,533,275 B2 | 9/2013 | Tousignant et al. | |
| 9,106,599 B2 | 8/2015 | Dandison et al. | |
| 10,623,362 B1* | 4/2020 | Hills | H04L 51/22 |
| 2007/0005715 A1* | 1/2007 | LeVasseur | H04L 63/145 |
| | | | 709/206 |
| 2009/0106375 A1 | 4/2009 | Carmel et al. | |

(Continued)

FOREIGN PATENT DOCUMENTS

CN    103430578 A    12/2013
CN    103685734 A    3/2014

(Continued)

OTHER PUBLICATIONS

Kevin Driscoll and Kjerstin Thorson. "Searching and Clustering Methodologies: Connecting Political Communication Content Across Platforms." The Annals of the American Academy of Political and Social Science. May 2015.

(Continued)

*Primary Examiner* — Nicholas R Taylor
*Assistant Examiner* — Sanjoy Roy
(74) *Attorney, Agent, or Firm* — Troutman Pepper Hamilton Sanders LLP (57) ABSTRACT

A system for generating a global conversation thread includes a processor that receives data associated with a plurality of individual conversations between one or more users using one or more user devices and models individual conversation threads based on the data. The processor also extracts features from the modeled conversation threads, and links the conversations based on the extracted features to create a global conversation thread. The individual conversations occur on different platforms and the global conversation thread includes content from the different platforms.

21 Claims, 7 Drawing Sheets

(56) References Cited

U.S. PATENT DOCUMENTS

| | | | |
|---|---|---|---|
| 2009/0228583 A1* | 9/2009 | Pocklington | H04L 51/00 709/224 |
| 2009/0306981 A1 | 12/2009 | Cromack et al. | |
| 2010/0169888 A1* | 7/2010 | Hare | H04L 67/22 718/102 |
| 2012/0124147 A1* | 5/2012 | Hamlin | H04L 51/16 709/206 |
| 2013/0007137 A1 | 1/2013 | Azzam et al. | |
| 2013/0218896 A1* | 8/2013 | Palay | G06F 16/22 707/741 |
| 2014/0236695 A1* | 8/2014 | Shvarts | G06Q 30/0224 705/14.25 |
| 2015/0006510 A1* | 1/2015 | Efrati | G06F 16/248 707/722 |
| 2015/0039289 A1* | 2/2015 | Mabogunje | G06Q 10/10 704/9 |
| 2016/0259778 A1* | 9/2016 | Cookson | G06Q 10/107 |
| 2017/0200093 A1 | 7/2017 | Motahari Nezhad | |
| 2017/0272388 A1* | 9/2017 | Bern | H04L 51/12 |
| 2019/0149501 A1 | 5/2019 | Bastide et al. | |
| 2019/0205897 A1 | 7/2019 | Maag et al. | |

FOREIGN PATENT DOCUMENTS

| | | |
|---|---|---|
| CN | 104246802 A | 12/2014 |
| CN | 104951478 A | 9/2015 |
| CN | 106506674 A | 3/2017 |
| EP | 1657871 B1 | 5/2018 |

OTHER PUBLICATIONS

Alistair Scott and Tamlyn Munslow. "Tracking Research and Policy Conversations in Online Spaces." Institute of Development Studies. Mar. 2015.

Dou Shen, Qiang Yang, Jian-Tao Sun, Zheng Chen. "Thread Detection in Dynamic Text Message Streams." SIGIR'06. Aug. 2006.

Shai Erera and David Carmel. "Conversation Detection in Email Systems." European Conference on Information Retrieval. Lecture Notes in Computer Science. vol. 4956. Mar. 2008.

International Search Report dated Aug. 31, 2020 in corresponding International (PCT) Patent Application No. PCT/IB2020/056064.

Chinese Office action dated Dec. 16, 2021 in related Chinese Application Serial No. 202010616941.3.

Non-Final Office Action dated Oct. 13, 2020 in related U.S. Appl. No. 16/460,485.

* cited by examiner

SYSTEM AND METHOD TO CREATE GLOBAL CONVERSATION THREAD ACROSS COMMUNICATION CHANNELS

TECHNICAL FIELD

The present application relates generally to conversations that occur on various platforms and, more particularly, to creating a global conversation thread across different communication channels.

BACKGROUND

Bank employees uses various channels to communicate within the bank and to the customers (such as emails, chat, voice). In situations that could be characterized as market abuse, the relevant communication usually happens on various channels and also between various parties. For example, John may be talking to a counterpart in another brokerage firm to decide the price of a foreign exchange via email or text messaging. Once they arrive at the pricing, John may use his phone to call his front desk to place an order to buy or sell certain currency in large number. In order to catch such scenarios, monitoring various channels separately is not sufficient.

Existing systems apply different techniques such as clustering and topic modeling to establish closely-related conversations and group them together using meta data such as message subject, participants, date of submission, and message content. Most systems analyze different conversations within the same channel—e.g., reviewing all emails to find emails that are related—and therefore miss information that may be present on another communication channel. There is a need for a system which can detect conversation threads across different communication channels and different conversation threads within those communication channels in order to create a global conversation thread that can be assessed for market abuse scenarios.

The present disclosure is directed to overcoming these and other problems of the prior art.

SUMMARY

In some embodiments, a computer-implemented method for creating a global conversation thread in a data processing system is disclosed. The data processing system may include a processing device and a memory comprising instructions which are executed by the processor. The method may include receiving data associated with a plurality of individual conversations between one or more users using one or more user devices, modeling individual conversation threads based on the data, extracting features from the modeled conversation threads, and linking the conversations based on the extracted features to create a global conversation thread. The individual conversations occur on different platforms and the global conversation thread includes content from the different platforms.

Additional embodiments may include a system and computer program product for creating the global conversation thread.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present disclosure relates to systems and methods used to create a global conversation thread by connecting conversations across different communication channels (different means of communication) by linking the conversations based on their content. A programmed system may look for certain information based on the content of the conversations in order to identify connected conversations, with a focus on scenarios that may involve market abuses by parties to the conversation or as a subject of the conversation.

Figure 1:
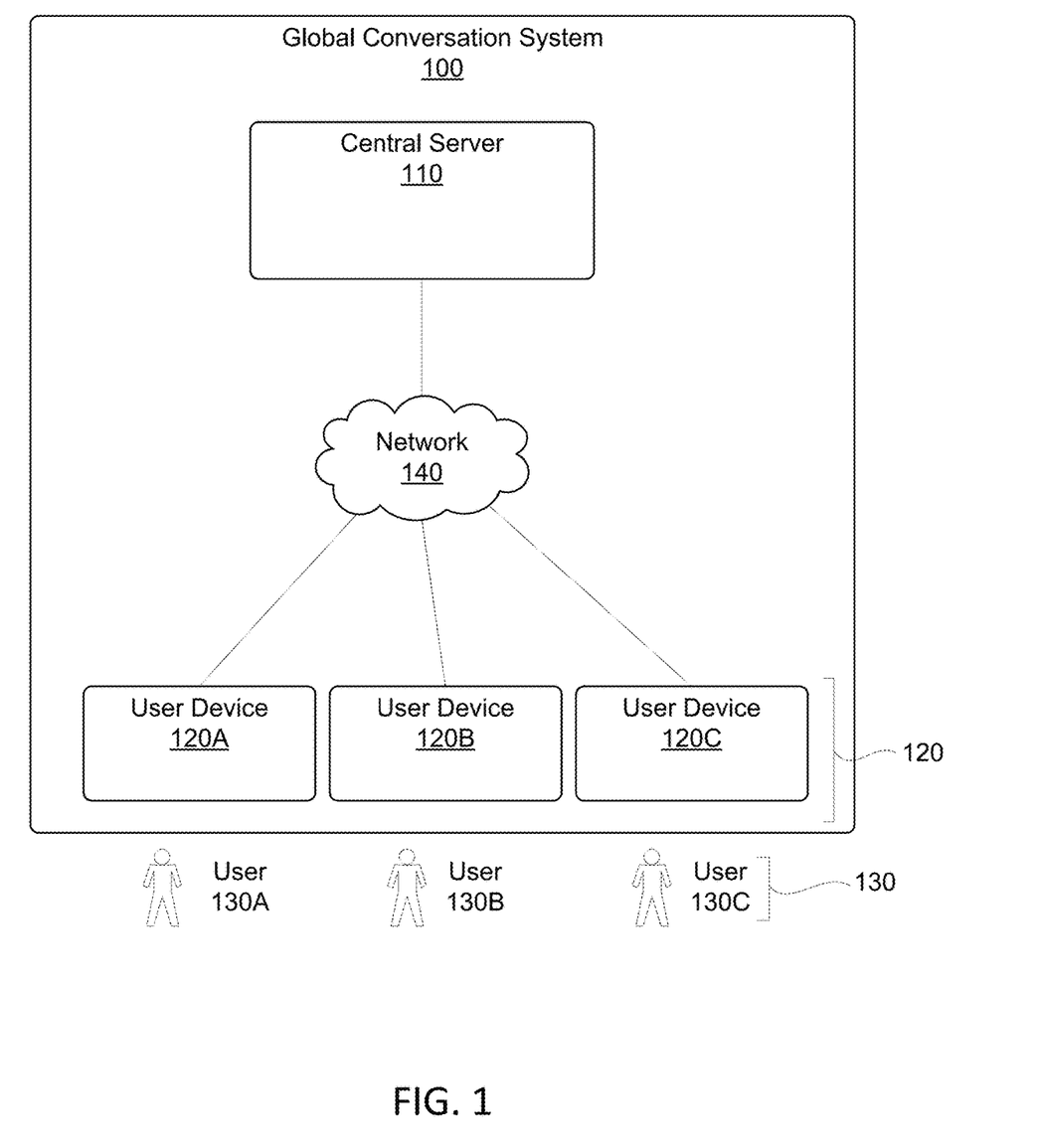
FIG. 1 depicts a schematic diagram of a global conversation system, consistent with disclosed embodiments.

FIG. 1 depicts a schematic diagram of one illustrative embodiment of a global conversation system 100. The global conversation system 100 includes, for example, a central server 110 and a plurality of user devices 120 each associated with a user 130 and which are all connected through a network 140. The central server 110 and the plurality of user devices 120 are functionally represented as singular separate components but it should be understood that the disclosed embodiments are not so limited. Moreover, the devices may be combined in some embodiments. For example, the central server 110 and/or the components thereof may be integrated into one or more of the user devices 120. The users 130 are individuals which are interchangeably described herein as participants in one or more individual conversations via user devices 120, wherein such individual conversations may be combined into a global conversation by the central server 110.

FIG. 1 illustrates three user devices 120A, 120B, 120C as making up the plurality of user devices 120 and three respective users 130A, 130B, 130C as making up the users 130. It should be understood that this representation is exemplary and that other embodiments may include more (or less) user devices 120 and associated users 130. Moreover, it is not necessary that each user device 120 only have one associated users 130. In some embodiments, a single user 130 may represent all participants associated with a user device 120, such as multiple people that are in assigned to the same role within an organizational structure (e.g., a manager, assistant, paralegal, accountant, etc.).

The central server 110 may be implemented in hardware and/or software and may include various constituent components. These components may include, for example, one or more processing devices, one or more memory devices, and/or one or more databases. The central server 110 is particularly configured as an information hub which is configured to receive data from the user devices 120 and transmit data to the user devices 120. For example, the central server 110 may be configured as a processing server which receives conversation data from the user devices 120.

In an embodiment, the central server 110 is a server, but is not limited to such an embodiment.

The user devices 120 are preferably computing devices configured to be operated by users 130 and deliver data to the global conversation system 100. The user devices 120 may be, for example, personal computers (e.g., laptops, desktops, etc.), tablets, smart phones, etc. The user devices 120 may include constituent components. These components may include, for example, I/O devices which are configured to collect data associated with user input, communication hardware for sending and receiving data to and from other components of the global conversation system 100, and a display device for displaying information to the user 130, such as a display screen configured to display a user interface. The user devices 120 are configured to support various platforms associated with conversations between users 130. For example, the user devices 120 may support communication platforms, such as platforms associated with messaging programs, email programs, video feeds, audio feeds, camera input and other images, web browsers, social media, mobile applications, etc.

The users 130 may be individuals which are associated with a respective user device 120. For example, the users 130 may be employees of one or more companies which are participating in a conversation. The users 130 are different people with different personal characteristics. The users 130 may be employees in different companies, departments, have different professions, etc. The users 130 may include customers and employees, such as clients and financial professionals managing the client's finances.

The network 140 may be a local or global network and may include wired and/or wireless components and functionality which enable communication between the central server 110 and the user devices 120. The network 140 may be embodied by the Internet, provided at least in part via cloud services, and/or may include one or more communication devices or systems which enable data transfer to and from the systems and components of the central server 110 and user devices 120.

In accordance with some exemplary embodiments, the elements of global conversation system 100 include logic implemented in specialized hardware, software executed on hardware, or any combination of specialized hardware and software executed on hardware, for implementing the global conversation system 100. In some exemplary embodiments, the global conversation system 100 may be or include the IBM Watson system available from International Business Machines Corporation of Armonk, N.Y., which is augmented with the mechanisms of the illustrative embodiments described hereafter.

Figure 2:
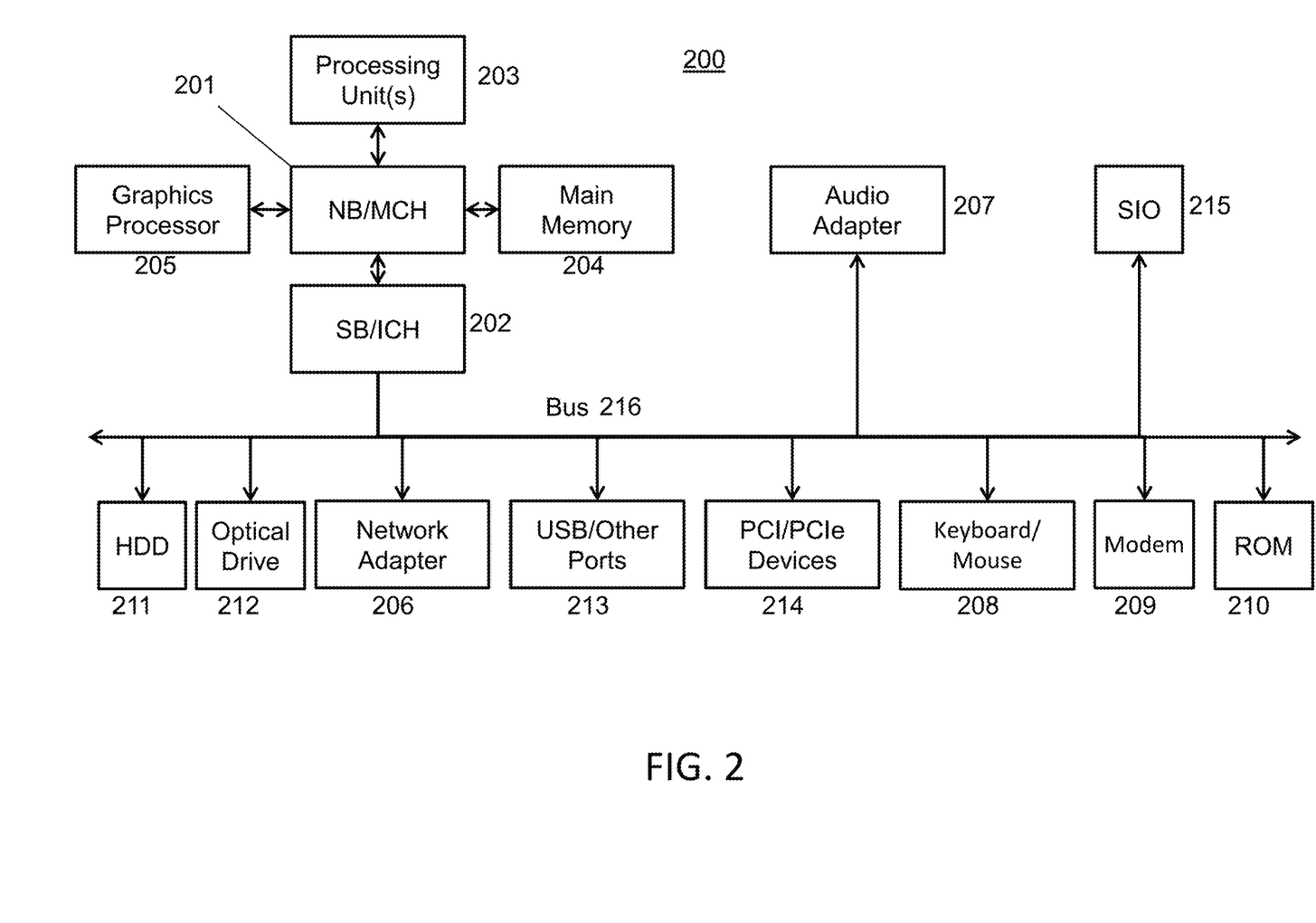
FIG. 2 is a block diagram of an example data processing system in which aspects of the illustrative embodiments are implemented.

FIG. 2 is a block diagram of an example data processing system 200 in which aspects of the illustrative embodiments are implemented. Data processing system 200 is an example of a computer, such as a server or client, in which computer usable code or instructions implementing the process for illustrative embodiments of the present invention are located. In one embodiment, FIG. 2 represents a server computing device, such as the central server 110, which implements the global conversation system 100 described herein.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH 201 through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH 202.

An operating system can run on processing unit 203. The operating system can coordinate and provide control of various components within the data processing system 200. As a client, the operating system can be a commercially available operating system. An object-oriented programming system, such as the Java™ programming system, may run in conjunction with the operating system and provide calls to the operating system from the object-oriented programs or applications executing on the data processing system 200. As a server, the data processing system 200 can be an IBM® eServer System P® running the Advanced Interactive Executive operating system or the Linux operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the global conversation system 100 can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. Other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Those of ordinary skill in the art will appreciate that the hardware depicted in FIG. 2 may vary depending on the implementation. For example, the data processing system 200 includes several components which would not be directly included in some embodiments of the global conversation system 100. However, it should be understood that a global conversation system 100 may include one or more of the components and configurations of the data processing system 200 for performing processing methods and steps in accordance with the disclosed embodiments.

Moreover, other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, the data processing system 200 can be any known or later developed data processing system without architectural limitation.

Figure 3:
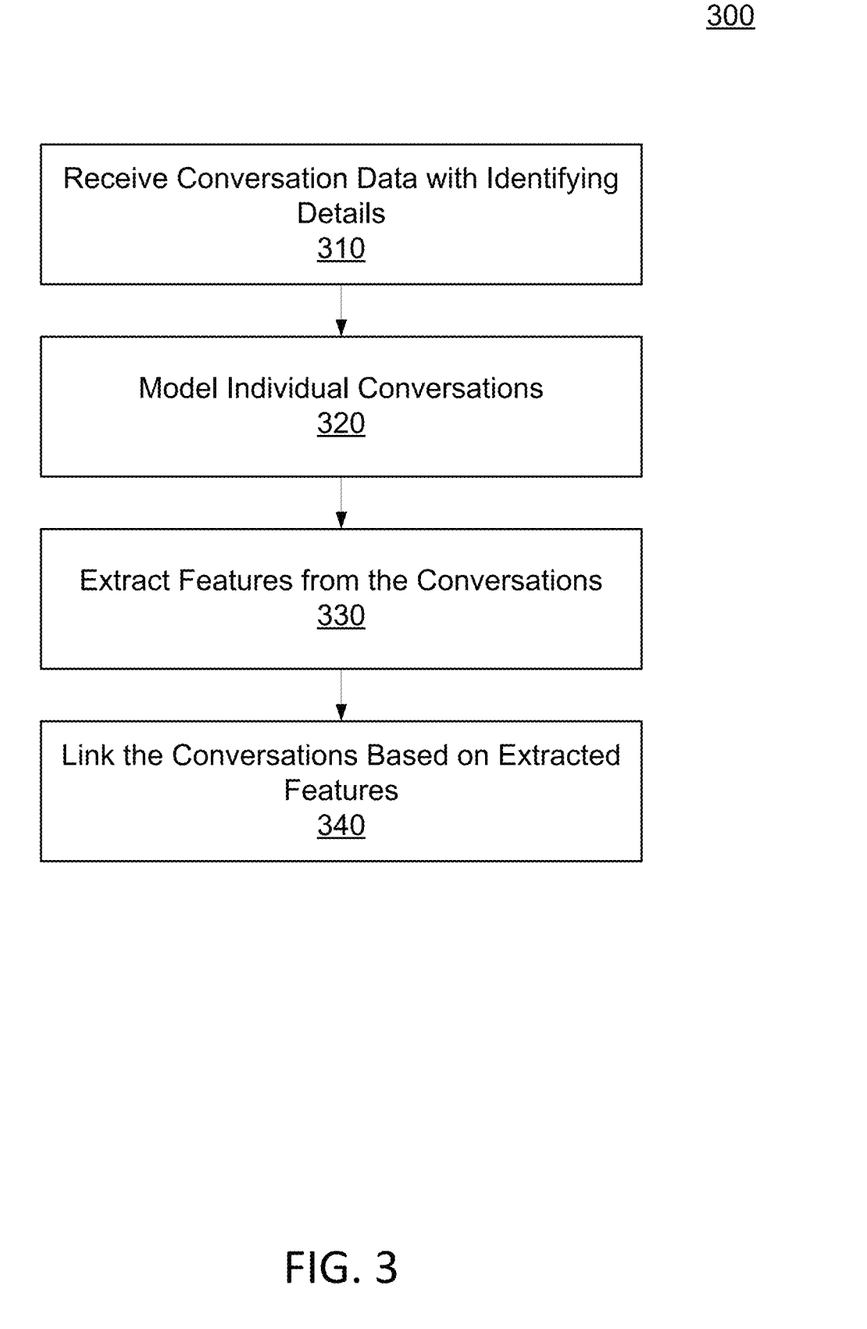
FIG. 3 is a flowchart of an example process for creating a global conversation thread, consistent with disclosed embodiments.

FIG. 3 is a flowchart of an exemplary process 300 for creating a global conversation thread. In an exemplary embodiment, the central server 110 may perform one or more steps of process 300. In step 310, the central server 110 receives conversation data including identifying details associated with one or more conversations from one or more user devices 120. The identifying details may include user information, conversation content, generic details, specific details, etc.

In step 320, the central server 110 may model each conversation thread. For example, the central server 110 may model each person as a node and each conversation between people as a connector between the nodes. Conversations may occur between two people, in one example. For example, a first employee may converse with a customer/client via email. Conversations may also occur between more than two people, such as in a conference call. In another example, a conversation may occur with only one user involved, such as through a memorandum, note, email to self, etc.

In step 330, the central server 110 may extract features from the conversations. For example, the central server 110 may extract personal information, and content features. The content features may include, for example, level one features and level two features. In other embodiments, the content features may include different categories of features (e.g., level one-four features). Level one features may include, for example, personal versus business, trade versus non-trade, forex versus equity to associate various categories and sub-categories of the communication. Level two features may be more specific and include, for example, ticker (i.e., stock or asset identifier) in the case of equity or currency in the case of foreign exchange transaction, number of units of ticker or currency and the price tag associated with the conversation, etc. Level two features may include transaction details associated with a financial transaction. In other words, level one features may be related to generic identifying features of the conversation and level two features may be more specifically related to the content and/or intent of the conversation.

In step 340, the central server 110 is may link related conversations to create a global conversation thread. The conversations detected by the central server 110 may occur between different people, via different user devices, and involve different platforms for the communication. However, each individual conversation may be related to one or more other individual conversations as part of a larger global conversation on the same topic. For example, two individuals may conduct a conversation related to market abuse, such as planned fraudulent activity. The conversation may occur across different platforms (e.g., a chat-based platform, an e-mail based platform, an audio-based platform, etc.), such as to attempt to avoid detection The central server 110 is configured to link related conversations across different platforms and devices to identify a global conversation that may allow the central server 110 to identify global conversation related to market abuse scenarios.

Figure 4:
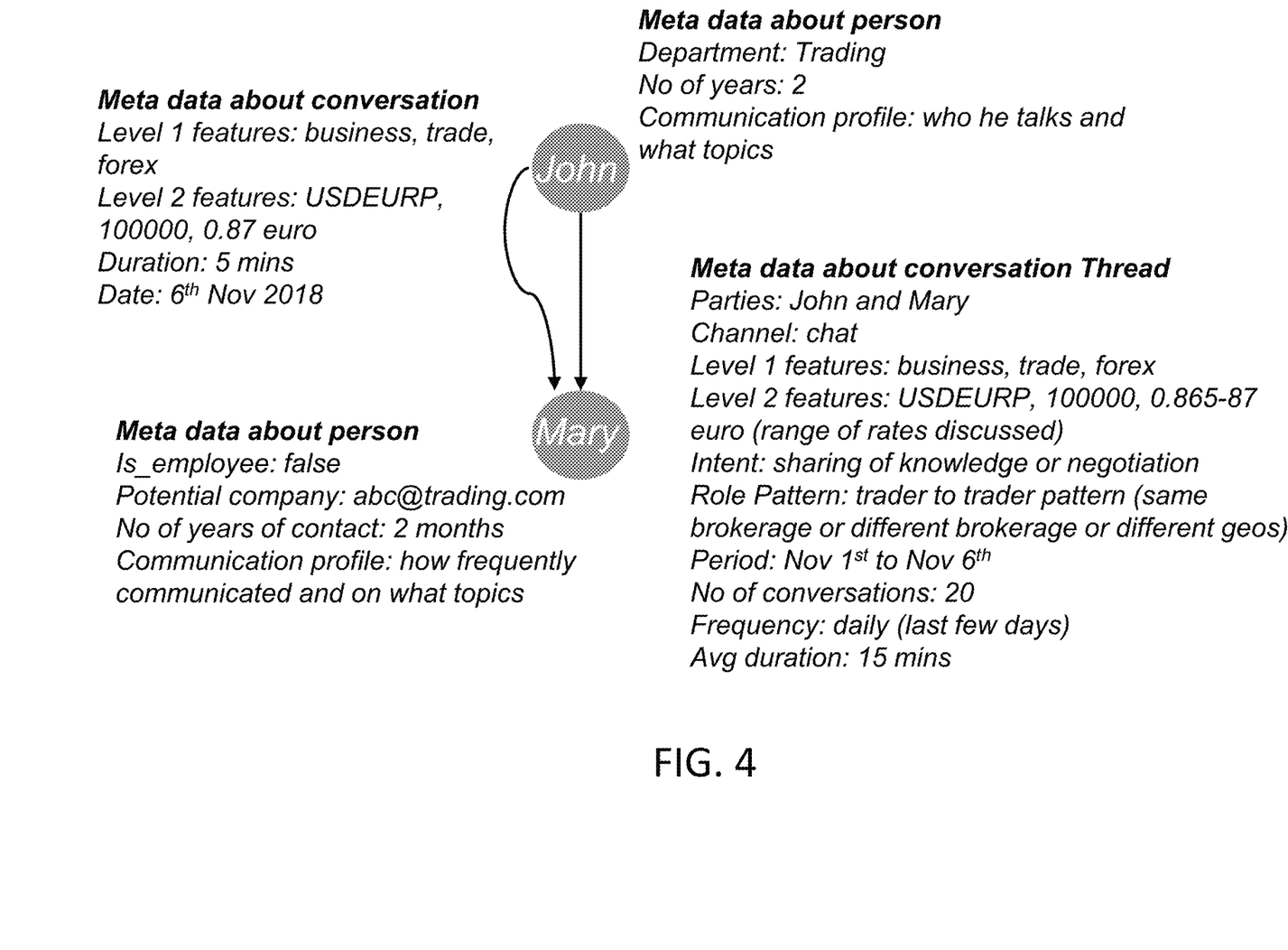
FIG. 4 is a diagram of a first conversation between individuals, consistent with disclosed embodiments.

FIG. 4 is an example model of a first conversation between two individuals "John" and "Mary." The data associated with the first conversation may include meta data about each person such as whether the person is an employee of a particular company, a potential identity of the person, a customer/company identifier, number of years of contact, and communication profile (e.g., how frequently communicated and what topics). If the individual (e.g., "John") is an employee, the personal information may include the department, the years employed, additional details regarding position, etc.

The data associated with the first conversation may also include meta data about the conversation (e.g., content data, background data, etc.). The content data may include level one features such as general category information (e.g., business, trade, forex, etc.), parties, platform/channel of the conversation (e.g., text messaging, chat channel, email, phone, video conference, social media, etc.), date, duration of call, etc. The content data may also include, for example, level two features such as financial details, such as an amount discussed, currency, ticker, etc.

The central server 110 may be configured to perform natural language processing to create additional meta data features for a conversation. For instance, the central server 110 may categorize a conversation based on words or phrases used, may determine an intent of a conversation, identify the topic of conversation, etc. The central server 110 may use a feedback/machine learning process to improve the process as more conversations are collected.

In some embodiments, the details associated with a single conversation between "John" and "Mary" may be grouped with other conversations between the same people as part of a grouped conversation thread. The conversation thread may also include details that are extracted by the central server 110, such as intent of the conversation, role pattern, period of conversation, number of conversations in the thread, etc. In some aspects, the grouped conversations between two individuals may be considered a "global conversation thread" that provides details about the discussion between the two people.

Figure 5:
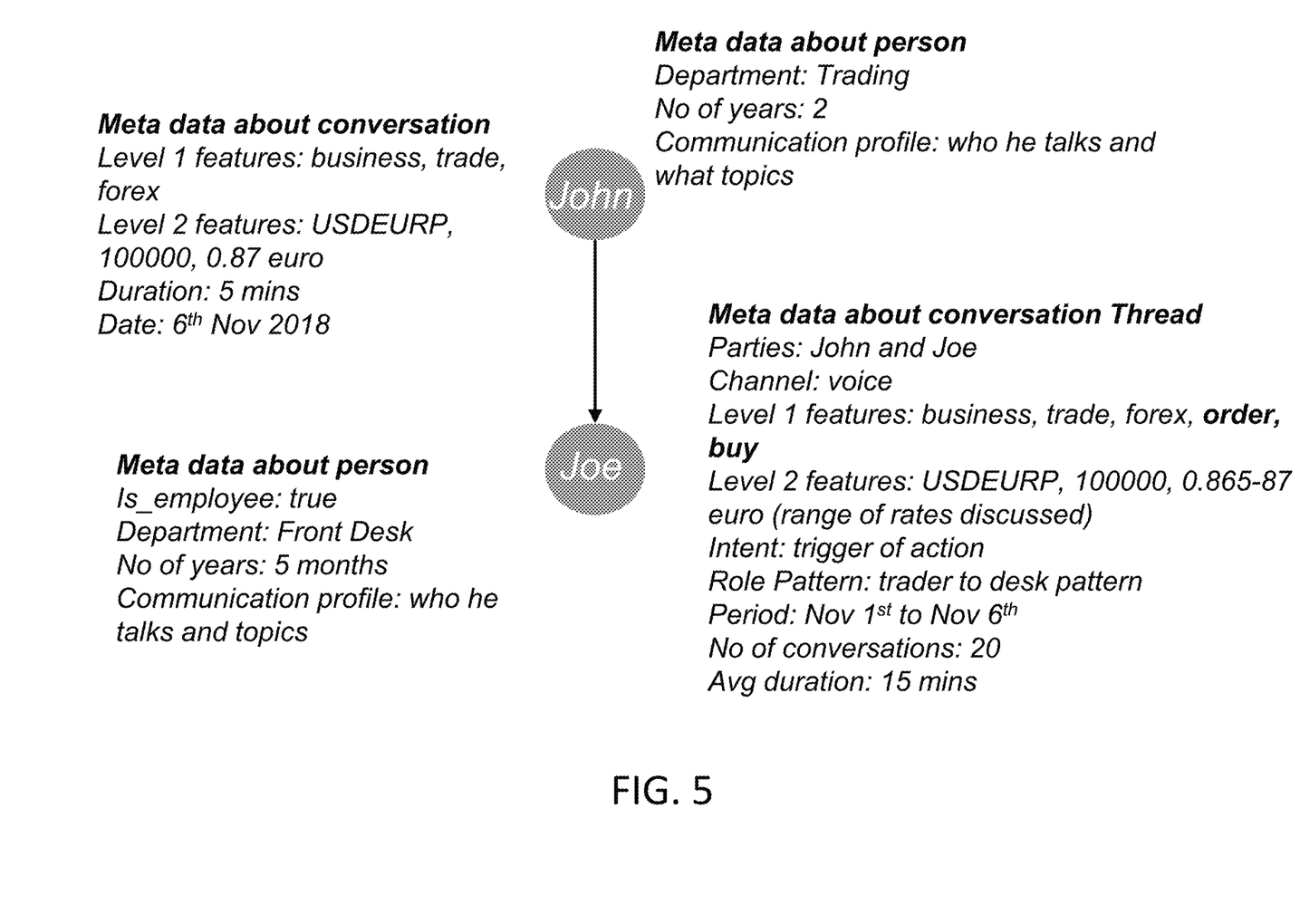
FIG. 5 is a diagram of a second conversation between individuals, consistent with disclosed embodiments.

FIG. 5 is another example model of a second conversation between two individuals "John" and "Joe." This conversation may be between two employees of the company, such as a member in the trading department and a front desk employee. The central server 110 may receive meta data about each person and content data about the conversation. The content data may include level one and level two features that generically and specifically describe the conversation. The central server 110 may track multiple conversations between the "John" and "Joe" and create a grouped conversation thread.

Figure 6:
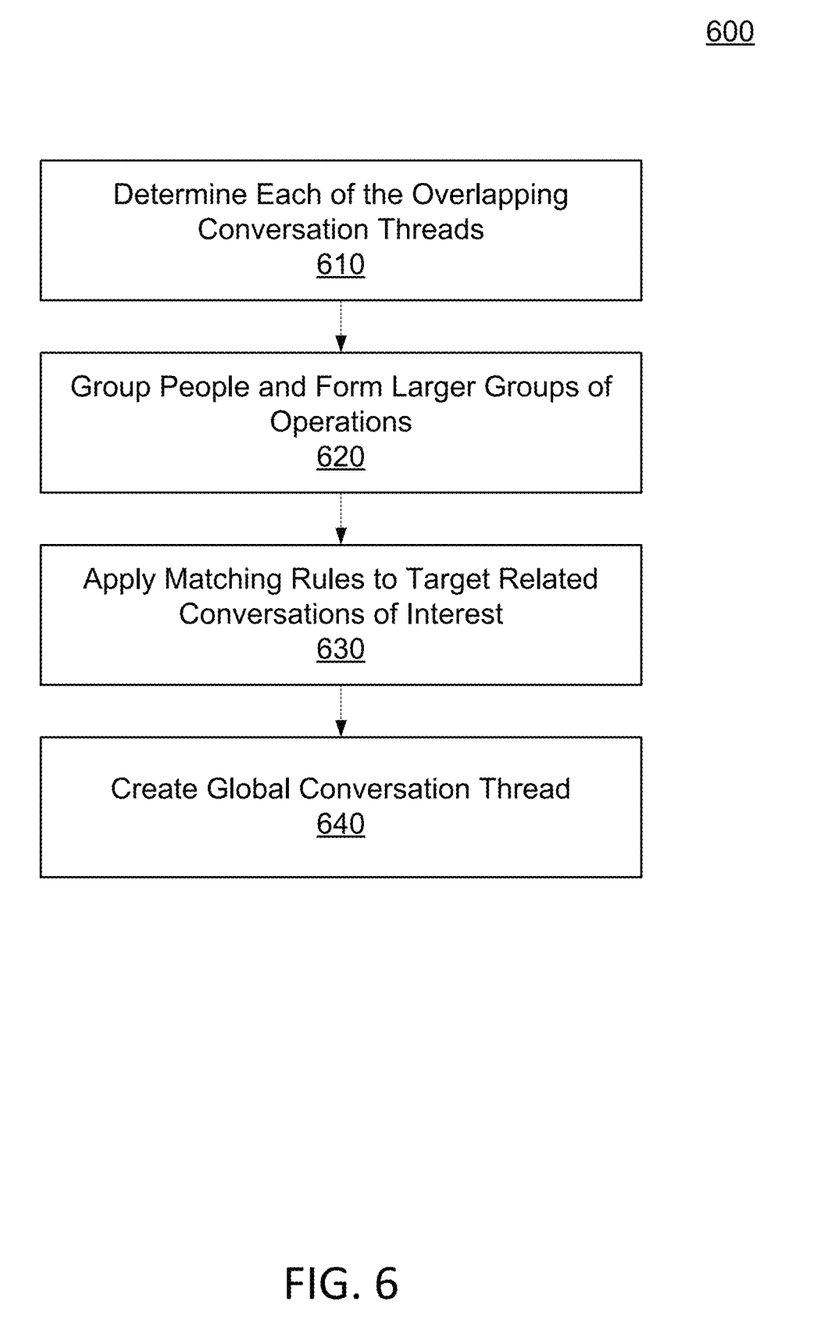
FIG. 6 is a flowchart of an example conversation linking process, consistent with disclosed embodiments.

FIG. 6 is a flowchart of an exemplary process 600 for linking individual conversations to create a global conversation thread. For instance, process 600 may include a process to link a single conversation instance to another single conversation instance. In another example, the process 600 may include linking a grouped conversation between two people to another grouped conversation between two other people (e.g., at least one different person). The central server 110 may perform one or more steps of process 600. The process 600 may be a stepped filtering process to determine which conversations are related. The central server 110 may target conversations about a particular topic, such as market abuse scenarios.

In step 610, the central server 110 may identify overlapping conversation threads. Step 610 may be an initial filtering mechanism based on certain features, such as timing, intent, role pattern, etc., to identify close/similar conversations. For example, the central server 610 may identify all conversations between particular people, roles, during a certain time, involving specific words. The central server 110 may use a simple rule model or a machine learning model to group the conversations.

In some embodiments, the central server 110 may identify overlapping conversations threads by comparing the proximity of one or more features of the conversation. For instance, the central server 110 may use timing proximity (e.g., how close in time the conversations occur), intent proximity (e.g., how similar the intent of the conversations are), or role pattern proximity (e.g., what role do the individuals have in the conversation and how similar is the pattern). The use of timing proximity may include matching conversations within a selected time period. The use of intent proximity, in some embodiments, includes comparing a similarity of topics of conversations within the conversation threads. The use of role pattern proximity may include comparing the positions of entities in conversations to identify similar patterns. The central server 110 may use a combination of timing proximity, intent proximity, and role pattern proximity to identify overlapping conversations between entities.

In step 620, the central server 110 may group people and form larger groups of operations. For example, the central server 110 may further filter conversations based on the people involved, the department within a company, the role of the individuals, etc.

In step 630, the central server 110 may use rules to target related conversations of interest. For example, the central server 110 may target conversations that include particular features, such as financial terms, ticker, negotiation terms, result of the conversation, event triggers, etc.

In some embodiments, the central server 110 may target related conversations based on a determined intent of the conversation. For example, the central server 110 may identify the role of a participant in an individual conversation and a determined intent of the conversation to determine whether there is a pattern across multiple conversations. The central server 110 may use a supervised machine learning model, such as a fraud analysis model to differentiate between valid (e.g., typical work conversations) and invalid (e.g., fraudulent behavior) activities.

In step 640, the central server 110 may collect filtered conversations and create a global conversation thread. The global conversation thread may include collected data that relates to the global conversation thread. For example, the global conversation thread may include level one features such as categories of the constituent conversations (e.g., business, trade, forex, order, buy). The global conversation thread may also include level two features such as communication patterns, etc. Other data may include time period of the overall conversation, number of individual conversations, average duration, etc.

In some embodiments, the global conversation thread may be analyzed for anomalies that may be of interest. For example, the central server 110 may provide the global conversation thread to a fraud detection system to determine whether the conversation includes or may include fraudulent or undesirable activity. The global conversation thread, being a combination of conversations across different platforms, enables the detection system to have a more complete picture of interactions between entities (e.g., the same people, people in the same roles), as opposed to only those conversations that occur on the same platform.

Figure 7:
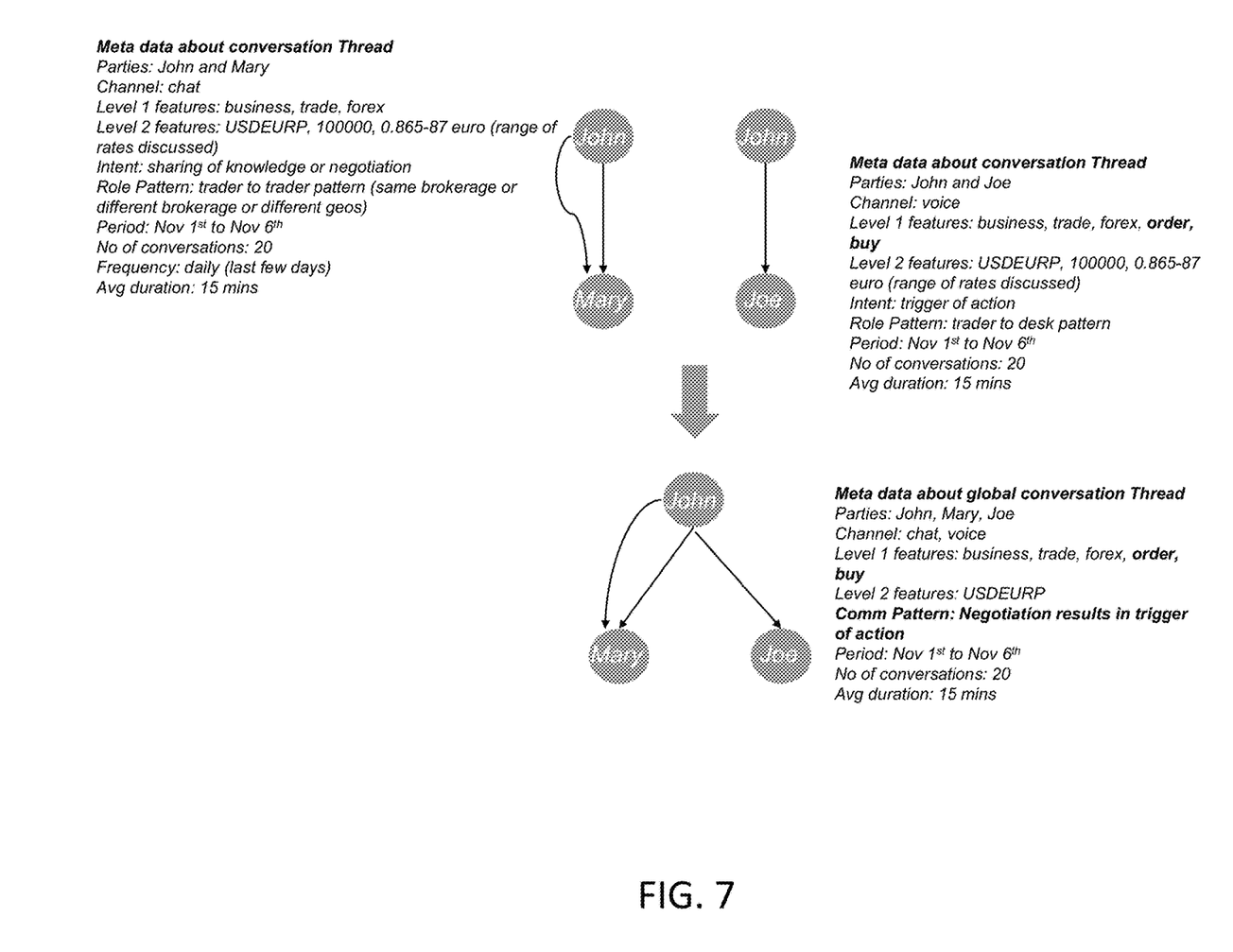
FIG. 7 is a diagram of a global conversation thread from the first and second conversations, consistent with disclosed embodiments.

FIG. 7 is an example model of a global conversation thread formed from the first conversation and the second conversation. For example, the global conversation may be a combined conversation between "John" and "Mary" and "Joe." The central server 110 may store meta data related to the global conversation thread. The communication may be user or group communication. The global conversation may be abstracted to the role instead of the individual. For example, instead of "Joe" the identifier may be a role, such as "front desk attendant."

An exemplary method for creating a global conversation thread includes identifying conversations across different communication channels and between various parties, modeling each conversation using connected nodes, extracting basic and specific details of the conversation, and linking modeled conversations to each other based on the extracted information. Disclosed embodiments include features that allow linking of conversations even if they are between different parties on different communication channels. As a potential result, the global conversation system may reliably detect market abuse situations by connecting the conversations across different communication channels. The system may include providing an alert when an anomaly is detected in a global conversation thread.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art, in view of the present description, that there are many other alternative implementations for these various elements that may be utilized in addition to, or in replacement of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method for creating a global conversation thread in a data processing system comprising a processing device and a memory comprising instructions which are executed by the processor, the method comprising:
   receiving data associated with a plurality of conversations between a plurality of users using one or more user devices;
   modeling conversation threads based on the data;
   extracting features from the modeled conversation threads; and
   linking the conversations based on the extracted features to create a global conversation thread, wherein the step of linking the conversations based on the extracted features further comprises identifying overlapping conversations by comparing proximity of the extracted features including timing proximity, intent proximity, and role pattern proximity, wherein the timing proximity includes matching conversations within a selected time period, the intent proximity includes comparing a similarity of topics of conversations within the conversation threads, and the role pattern proximity includes comparing positions of the plurality of users,
   wherein the conversations occur on different platforms and the global conversation thread includes content from the different platforms.

2. The method of claim 1, wherein the step of modeling the conversation threads includes representing an entity as a node and connecting the entities that have a conversation.

3. The method of claim 2, wherein the extracted features comprise basic features and specific features, wherein the basic features comprise generic identifying features of the plurality of conversations, and wherein the specific features comprise features related to one or more of a group consisting of a content of the plurality of conversations and an intent of the plurality of conversations.

4. The method of claim 3, wherein the basic features comprise classifications of the entities or topic of conversation.

5. The method of claim 3, wherein the specific features comprise transaction details associated with a financial transaction.

6. The method of claim 2, wherein the entity is an individual.

7. The method of claim 2, wherein the entity is a job role encompassing multiple individuals, wherein the multiple individuals have the same job role.

8. The method of claim 1, wherein the extracted features comprise meta data.

9. The method of claim 8, wherein the meta data comprises identifying information of the users.

10. The method of claim 8, wherein the meta data comprises a date range and an average duration of the plurality of conversations.

11. A system for creating a global conversation thread comprising a processing device and a memory comprising instructions which are executed by the processor to perform a method comprising:
    receiving data associated with a plurality of conversations between one or more users using one or more user devices;
    modeling conversation threads based on the data;
    extracting features from the modeled conversation threads; and
    linking the conversations based on the extracted features to create a global conversation thread, wherein the step of linking the conversations based on the extracted features further comprises identifying overlapping conversations by comparing proximity of the extracted features including timing proximity, intent proximity, and role pattern proximity, wherein the timing proximity includes matching conversations within a selected time period, the intent proximity includes comparing a similarity of topics of conversations within the conversation threads, and the role pattern proximity includes comparing positions of the plurality of users,
    wherein the conversations occur on different platforms and the global conversation thread includes content from the different platforms.

12. The system of claim 11, wherein the step of modeling the conversation threads includes representing an entity as a node and connecting the entities that have a conversation.

13. The system of claim 12, wherein the extracted features comprise basic features and specific features, wherein the basic features comprise generic identifying features of the plurality of conversations, and wherein the specific features comprise features related to one or more of a group consisting of a content of the plurality of conversations and an intent of the plurality of conversations.

14. The system of claim 13, wherein the basic features comprise classifications of the entities or topic of conversation.

15. The system of claim 13, wherein the specific features comprise transaction details associated with a financial transaction.

16. The system of claim 12, wherein the entity is an individual.

17. The system of claim 12, wherein the entity is a job role encompassing multiple individuals, wherein the multiple individuals have the same job role.

18. The system of claim 11, wherein the extracted features comprise meta data.

19. The system of claim 8, wherein the meta data comprises identifying information of the users.

20. The system of claim 8, wherein the meta data comprises a date range and an average duration of the plurality of conversations.

21. A computer program product configured to create a global conversation thread, the process comprising:
    receiving data associated with a plurality of conversations between one or more users using one or more user devices;
    modeling conversation threads based on the data;
    extracting features from the modeled conversation threads; and linking the conversations based on the extracted features to create a global conversation thread, wherein the step of linking the conversations based on the extracted features further comprises identifying overlapping conversations by comparing proximity of the extracted features including timing proximity, intent proximity, and role pattern proximity, wherein the timing proximity includes matching conversations within a selected time period, the intent proximity includes comparing a similarity of topics of conversations within the conversation threads, and the role pattern proximity includes comparing positions of the plurality of users, wherein the conversations occur on different platforms and the global conversation thread includes content from the different platforms.

* * * * *